United States Patent
Murray et al.

(10) Patent No.: US 7,416,013 B2
(45) Date of Patent: Aug. 26, 2008

(54) WINDOW BARRIER

(75) Inventors: Kurt R. Murray, Carmel, IN (US); Jeffrey T. Bounds, Fishers, IN (US)

(73) Assignee: Pro-gard Products, LLC, Indianapolis, IN (US)

( * ) Notice: Subject to any disclaimer, the term of this patent is extended or adjusted under 35 U.S.C. 154(b) by 15 days.

(21) Appl. No.: 10/694,484

(22) Filed: Oct. 27, 2003

(65) Prior Publication Data

US 2004/0134626 A1 Jul. 15, 2004

Related U.S. Application Data

(60) Provisional application No. 60/421,500, filed on Oct. 25, 2002.

(51) Int. Cl.
*E06B 3/32* (2006.01)

(52) U.S. Cl. .......................................... 160/105; 49/57

(58) Field of Classification Search ................. 160/105, 160/370.21, DIG. 2, 104, 369, DIG. 3; 52/202; 49/54, 55, 57; 296/24.4, 24.42, 24.43
See application file for complete search history.

(56) References Cited

U.S. PATENT DOCUMENTS

| | | | |
|---|---|---|---|
| 1,596,795 A | | 8/1926 | Blakeney |
| 1,608,785 A | * | 11/1926 | Evans ........................... 160/105 |
| 1,702,395 A | * | 2/1929 | Anderson .................... 160/105 |
| 2,803,471 A | | 8/1957 | Roth |
| 2,805,712 A | * | 9/1957 | McVicker .................... 160/369 |
| 2,892,495 A | | 6/1959 | Hadden |
| 2,997,103 A | * | 8/1961 | Buchanan .................... 160/369 |
| 3,032,351 A | | 5/1962 | Lewis, Jr. |
| 3,204,981 A | | 9/1965 | Edwards |
| 4,139,233 A | * | 2/1979 | Bott ............................ 296/200 |
| 4,643,477 A | | 2/1987 | Kovatch |
| 4,653,562 A | | 3/1987 | Moss et al. |
| 4,685,717 A | | 8/1987 | Gaston |
| 4,854,364 A | | 8/1989 | Junker |
| 4,913,212 A | | 4/1990 | Clavier |
| 5,311,701 A | * | 5/1994 | Psaros ........................... 49/57 |
| 5,419,605 A | | 5/1995 | Puaatuua |
| 5,524,694 A | | 6/1996 | Arapis |
| 5,768,827 A | | 6/1998 | Hackett |
| 5,829,388 A | * | 11/1998 | Rosso ........................ 119/416 |
| 5,857,730 A | | 1/1999 | Korpi et al. |
| 5,954,384 A | | 9/1999 | Jones |
| 6,192,628 B1 | | 2/2001 | Pinheiro et al. |
| 6,367,536 B1 | | 4/2002 | St. Louis |
| 6,669,259 B2 | | 12/2003 | Murray et al. |

OTHER PUBLICATIONS

Galls, VP203 Galls Removable Window Barriers Quick Release Install Brochure, pp. 1-2.
Setina Window Barriers, Window Barriers/Door Panel/Skid Plate Brochure, p. 14.
Pro-Gard Industries Installation Instructions for the '92-97' Crown Victoria, circa 2001.
Pro-Gard Industries Installation Instructions for the '98-o2' Crown Victoria, circa 2001.

* cited by examiner

*Primary Examiner*—David Purol
(74) *Attorney, Agent, or Firm*—Baker & Daniels LLP (57) ABSTRACT

A window barrier configured to be removably supported adjacent to the interior side of a vehicle door.

18 Claims, 10 Drawing Sheets

WINDOW BARRIER

CROSS REFERENCE TO RELATED APPLICATION

This application claims priority to U.S. Provisional Patent Application Ser. No. 60/421,500, filed Oct. 25, 2002, the disclosure of which is expressly incorporated by reference herein.

BACKGROUND AND SUMMARY OF THE INVENTION

The present invention relates generally to window barriers or safety guards for use within the passenger compartment of a vehicle. More particularly, the present invention relates a window barrier that is removably securable adjacent to an interior side of a vehicle door.

Window barriers or safety guards that are mountable to vehicle doors are known in the art. For example, U.S. Pat. Nos. 3,032,351 and 4,653,562 both disclose window safety guards for temporary placement within the window channels of a vehicle door when the window is in an open position. However, window barriers are often required for use when the vehicle window is in either an open position or a closed position.

Further, window barriers are often required for use within the rear passenger compartments of law enforcement vehicles, such as police cars when transporting prisoners. Such window barriers are used to prevent prisoners from escaping and from kicking or otherwise impacting the closed window and causing damage thereto.

Such prior art window barriers configured for use with vehicles doors typically require unsightly permanent deformation of interior door components. More particularly, holes must be drilled in numerous locations within an interior surface of the door whereby fasteners are inserted therethrough to secure the window barrier to the door. It may be appreciated that such prior installations are typically time consuming and result in permanent damage to the vehicle. Furthermore, it is often difficult and time consuming to remove such conventional window barriers in order to gain access to the interior surface of the window for general maintenance and cleaning.

In an illustrative embodiment, a window barrier in accordance with the present invention is configured to be coupled to a vehicle door supported within a door frame, the vehicle door including a window panel supported within a window channel and door trim supported in spaced relation to the window channel. The window barrier comprises an upper frame member, a lower frame member supported in spaced relation below the upper frame member, and at least one barrier element extending between the upper frame member and the lower frame member. A first securing member is configured to releasably secure the upper frame member to the door, the first securing member including a retaining portion configured to operably couple with the door trim and positioned in spaced relation to the window channel. A second securing member is configured to releasably secure the lower frame member to the door.

Illustratively according to the embodiment, the first securing member comprises at least one clip connected to the upper frame member, wherein the clip includes a connector and first and second arms extending from the connector. The second arm of the clip defines the retaining portion which is configured to be received within a slot formed within the door trim. Alternatively, the first arm of the clip is configured to be received intermediate an outer weather strip and the door, and the second arm of the clip is configured to be received intermediate an inner weather strip and the door.

Further illustratively according to the embodiment, the upper frame member includes at least one notch configured to provide access to the at least one clip.

Illustratively, the clip includes a portion configured to be received intermediate the door frame and the door.

Illustratively according to the embodiment, the second securing member includes a longitudinally extending retaining flange configured to be received within a slot formed within an interior surface of the door.

Further illustratively according to the embodiment, the at least one barrier element includes a plurality of substantially vertically extending barrier members. Each of the barrier members illustratively comprises a substantially cylindrical rod. Further illustratively, the plurality of barrier members are configured to generally follow the angle of inclination of the window panel supported by the door.

According to a further illustrative embodiment, a window barrier in accordance with the present invention includes an upper frame member, a lower frame member supported in spaced relation below the upper frame member, the lower frame member including a panel rest portion and a retaining flange, and a connecting portion connecting the panel rest portion and the retaining flange. The panel rest portion and the retaining flange extend downwardly from the connecting portion, the panel rest portion being configured to rest against an interior surface of the vehicle door, and the retaining flange configured to be received within a slot formed within the door intermediate the interior surface and a window supported within the door. At least one barrier element is supported by the connecting portion of the lower frame member.

Illustratively according to the embodiment, the lower frame member defines a substantially U-shaped channel.

Further illustratively according to the embodiment, the lower frame member comprises a notch configured to receive a lock button supported by the door.

Illustratively according to the embodiment, a securing member is configured to releasably secure the upper frame member to the vehicle door. The securing member illustratively comprises at least one clip connected to the upper frame member, wherein the clip includes a connector and first and second arms extending from the connector. Illustratively, the first arm of the clip is secured to the upper frame member and the second arm of the clip is received within a slot formed within the door.

Illustratively according to the embodiment, the at least one barrier element comprises a plurality of substantially vertically extending barrier members each of the barrier members positioned in spaced relation to an adjacent one of the barrier members. The plurality of barrier members are illustratively configured to generally follow an angle of inclination of the window supported by the door.

In a further illustrative embodiment, a window barrier in accordance with the present invention is configured to be coupled to a vehicle door supported within a door frame, the vehicle door including a window panel supported within a window channel. The window barrier comprises a barrier frame including upper and lower ends, an upper securing member coupled to the barrier frame proximate the upper end, a lower securing member coupled to the barrier frame proximate the lower end, and at least one barrier element supported by the barrier frame. The upper securing member includes a portion configured to be received intermediate the door frame and the door, wherein movement of the upper end of the barrier frame in a first direction is prevented by the door frame and movement of the upper end of the barrier frame in a second direction opposite the first direction is prevented by the door.

Illustratively according to the embodiment, the upper securing member comprises at least one clip including a connector and first and second arms extending from the connector. Illustratively, the first arm of the clip is secured to the upper end of the barrier frame and the second arm of the clip is configured to be received within a slot formed within the door. Alternatively, the first arm of the clip is configured to be received intermediate an outer weather strip and the door, and the second arm of the clip is configured to be received intermediate an inner weather strip and the door.

Illustratively according to the embodiment, the lower securing member comprises a retaining flange configured to be received within a channel formed within the door intermediate the interior surface and the window panel supported within the door. Illustratively, a panel rest portion is connected to the retaining flange and is configured to rest against an interior surface of the vehicle door.

Further illustratively according to the embodiment, the at least one barrier element comprises a plurality of substantially vertically extending barrier members.

In a further illustrative embodiment, a vehicle window barrier in accordance with the present invention comprises a barrier frame including an upper end and a lower end, means for coupling the upper end of the barrier frame to an upper slot formed within an interior surface of a door, means for restraining the upper end of the barrier frame intermediate a vehicle door and a door frame, and means for coupling the lower end of the barrier frame to a lower slot formed within an interior surface of the door.

Illustratively according to the embodiment, the means for coupling the upper end of the frame comprises at least one clip connected to the barrier frame proximate the upper end. The clip illustratively includes a connector and first and second arms extending from the connector.

Illustratively, the means for coupling the upper end of the barrier frame includes a portion configured to be received intermediate the door and the door frame, wherein movement of the upper end of the barrier frame in a first direction is prevented by the door frame and movement of the upper end of the barrier frame in a second direction opposite the first direction is prevented by the door.

Further illustratively according to the embodiment, the means for coupling the lower end of the barrier frame comprises a channel member including a panel rest portion, and a retaining flange connected to the panel rest portion. Illustratively, the panel rest portion is configured to rest against an interior surface of the vehicle door, and the retaining flange is configured to be received within a channel formed within the door intermediate the interior surface and a window supported within the door.

Additional features and advantages of the present invention will become apparent to those skilled in the art upon a consideration of the following detailed description of illustrated embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1A:
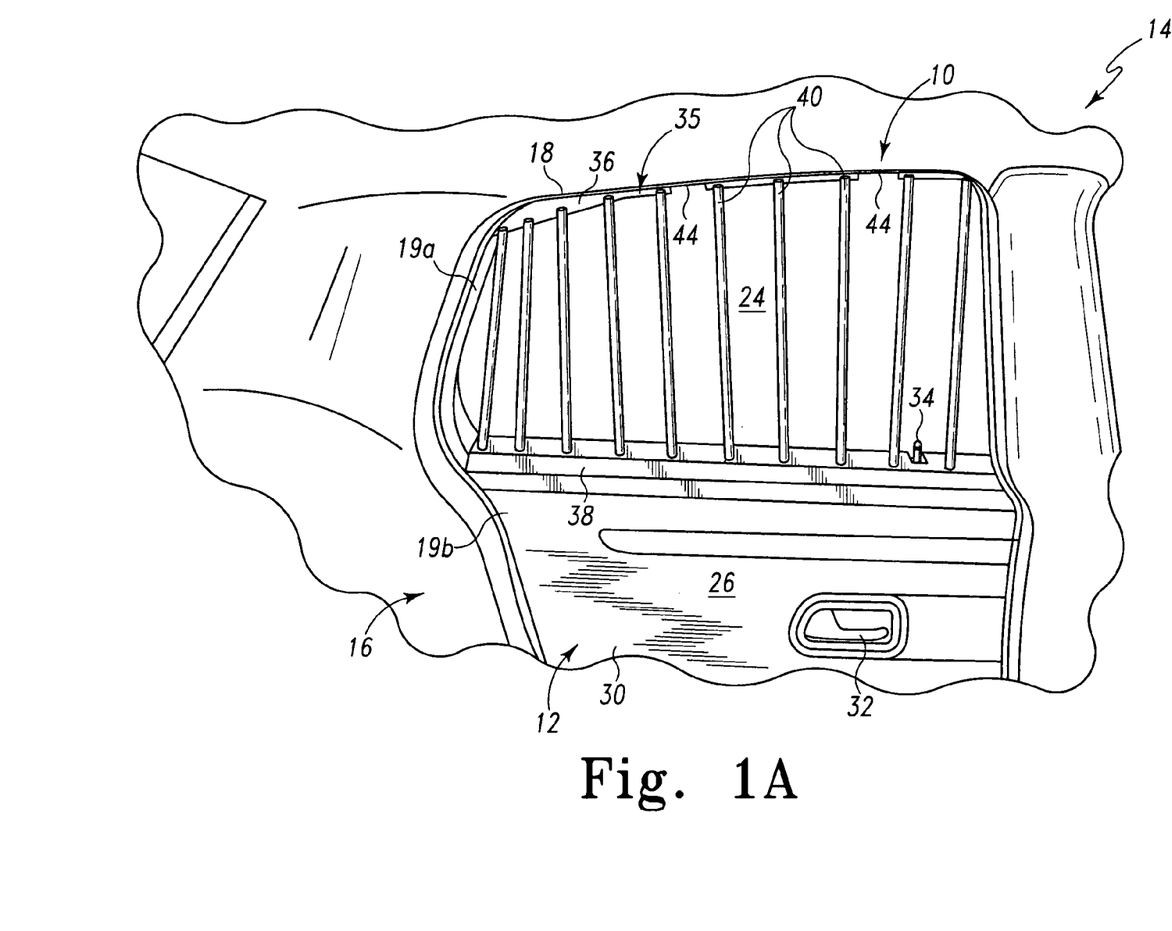
FIG. 1A is a front elevational view illustrating a window barrier of the present invention removably secured to an interior side of an original equipment manufacturer (OEM) vehicle door.

Referring initially to FIG. 1A, a window barrier 10 in accordance with the present invention is illustrated as being removably supported on the interior side of a conventional door 12 supported by a vehicle 14. More particularly, the window barrier 10 is attached to the door 12 and is configured to be received within the interior of a passenger compartment 16.

Figure 4:
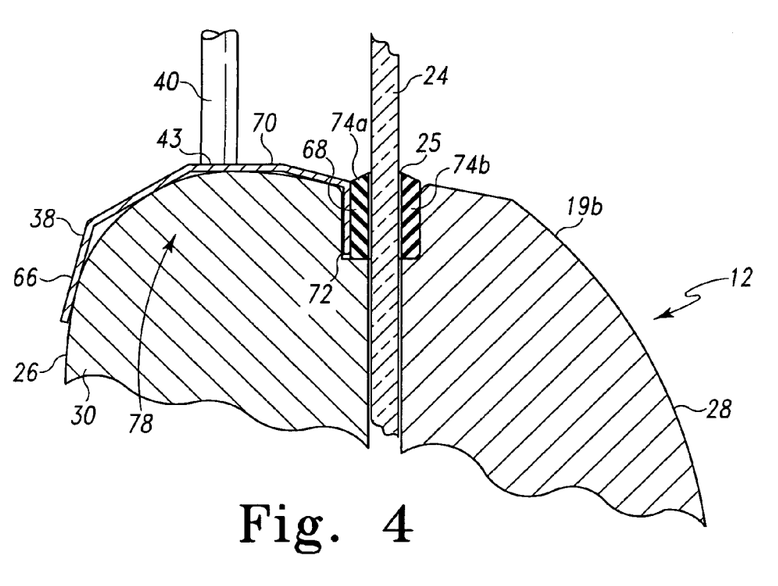
FIG. 4 is a cross-sectional view illustrating the coupling of the lower end of the window barrier to the vehicle door of FIG. 1A.
Figure 5:
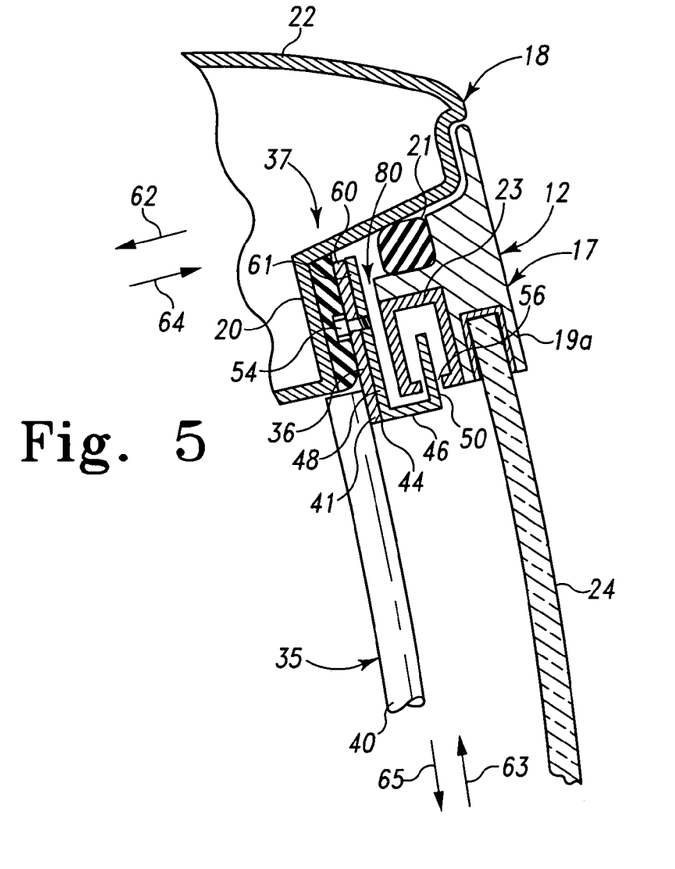
FIG. 5 is a cross-sectional view illustrating the coupling of the upper end of the window barrier to the vehicle door of FIG. 1A.

With further reference to FIGS. 1A, 4, and 5, the door 12 is of conventional design and includes a support frame 17 which is hingedly supported within a door frame 18. The support frame 17 includes upper and lower portions 19a and 19b, while the door frame 18 includes a rim 20 positioned immediately below the roof 22 of the vehicle 14. The upper portion 19a of support frame 17 includes a cross-sectional shape complementary to an inner portion of the door rim 20. Outer and inner weather strips or door trims 21 and 23 are secured to the support frame 17 to provide a seal between the support frame 17 and the door frame 18 when the door 12 is in a closed position.

The door 12 includes a window panel or pane 24 supported within a window channel 25 for substantially vertical movement between a raised, or closed, position and a lowered, or open, position. The door 12 includes an interior surface 26 and an exterior surface 28. The door 12 further includes a door panel 30 which may include a conventional door latch lever 32 configured to release a latch (not shown) securing the door 12 in a closed position. A conventional locking knob 34 may be supported above the door panel 30 and is configured to prevent release of the latch.

While the following description will describe the window barrier 10 in connection with the door 12 positioned at the rear driver side of the vehicle 14, it should be appreciated that the window barrier 10 may find equal applicability with any door within the vehicle 14. Moreover, in many applications, the window barriers 10 will be attached to both rear passenger compartment doors 12. Further, for the purposes of illustration, the door 12 is shown in FIG. 1A as including a conventional original equipment manufacturer (OEM) door panel 30. More particularly, the window barrier of FIGS. 1A-6 is illustrated as coupled to an OEM door 12 of a 1998-2003 Ford Crown Victoria automobile 14. However, it should be appreciated that the particular vehicle 14 illustrated in no way limits the scope of the present invention and that the window barrier 10 may be used in connection with other vehicles.

Figure 1B:
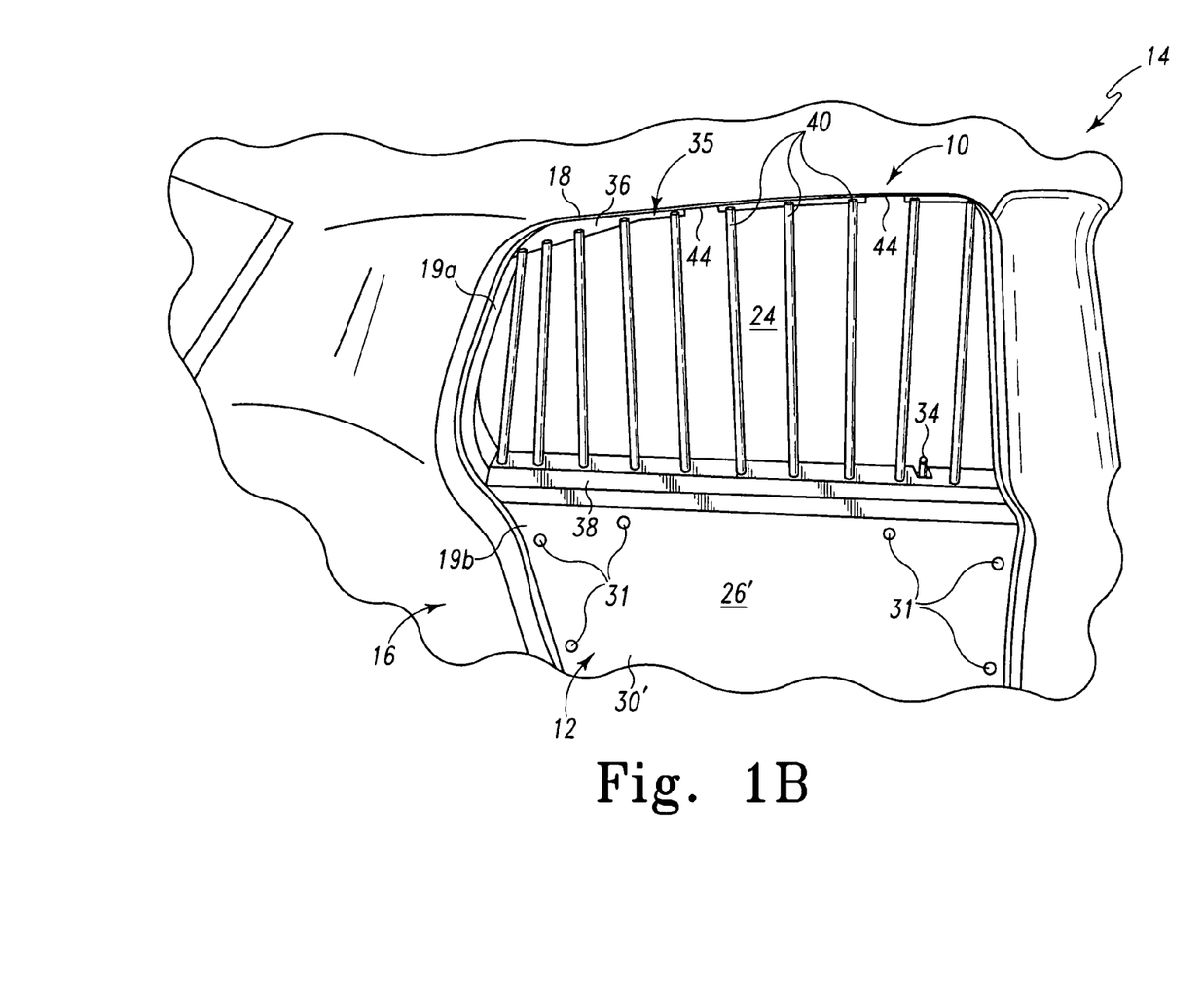
FIG. 1B is a front elevational view illustrating the window barrier of FIG. 1A removably secured to an interior side of an alternative embodiment vehicle door including a retrofit door panel.
Figure 2:
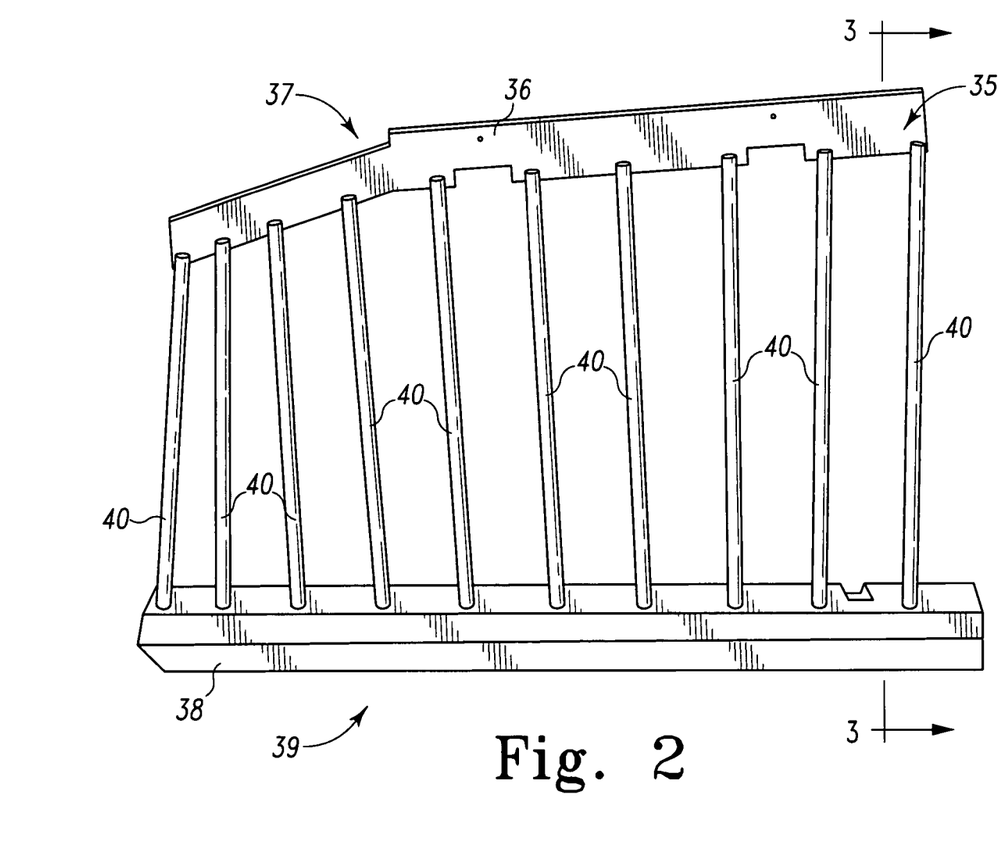
FIG. 2 is a front elevational view of the frame of the window barrier of FIG. 1A.

As shown in FIG. 1B, the window barrier 10 may be used in connection with a retrofit door panel 30' comprising any one of a wide variety of retrofit door panels commonly used in law enforcement vehicles. For example, the retrofit door panel 30' may comprise a sheet of approximately ⅛" thick Acrylonitribe-Butadiene-Styrene (ABS) plastic secured through fasteners, such as screws 31, to the lower frame 19b of door 12' in place of the OEM door panel 30. Such a retrofit door panel 30' not only protects the interior surface 26' of the door 12' from impact but removes the door latch lever 32 to prevent access thereto by a prisoner. Likewise, the locking knob 34 may be removed from the door 12'. In an illustrative embodiment, the retrofit door panel 30' is rear door panel Model No. V116, available from Pro-Gard Police Products of Indianapolis, Ind.

It is further noted that the window barrier 10 may comprise an element or component of a prisoner containment system. The prisoner containment system may comprise the window barrier 10, the retrofit door panel 30', and a vehicle partition such as that disclosed in U.S. patent application Ser. No. 10/290,568, which is assigned to the assignee of the present invention and is expressly incorporated by reference herein. The prisoner containment system may also comprise a prisoner transfer seat which is configured to replace the conventional rear seat of the vehicle. Such a prisoner transfer seat is often formed of ABS plastic and may comprise Model No. S6001F, available from Pro-Gard Police Products of Indianapolis, Ind. A floor pan may be used in cooperation with the prisoner transfer seat and is illustratively formed of ABS plastic. The floor pan may comprise Model No. S605IF, also available from Pro-Gard Police Products of Indianapolis, Ind.

Referring further to FIGS. 1A-3, the window barrier 10 includes a barrier frame 35 having an upper frame member 36 extending longitudinally and defining an upper end 37 of the barrier frame 35. A lower frame member 38 is supported in spaced relation below the upper frame member 36 and defines a lower end 39 of the barrier frame 35. A plurality of barrier elements or members 40 extend intermediate the upper end 37 and the lower end 39 of the barrier frame 35 and are attached to the upper frame member 36 and the lower frame member 38, illustratively through welds 41 and 43, respectively. Illustratively, the barrier frame 35 and the barrier elements 40 are formed of a strong durable material, such as hardened steel, wherein the barrier elements 40 are welded to the upper and lower frame members 36 and 38. It should be appreciated that the barrier elements 40 may be formed from other suitable materials, such as impact resistant thermoplastics. Further, the number and the orientation of the barrier elements 40 in no way limits the scope of invention and may be varied depending upon the structural details of the vehicle 14 and vehicle partition, if any. Additionally, the barrier elements 40 may be formed from an expanded metal or a punched plate of rigid material.

In the illustrated embodiment, the barrier elements 40 comprise a plurality of spaced rods having a substantially circular cross-section for enhanced strength. The barrier elements 40 may be angled or curved to generally follow the angle of inclination of the window 24. More particularly, each barrier element 40 of the illustrative embodiment of FIG. 3 curves inwardly toward the passenger compartment 16 of the vehicle 14 as it extends from the lower end 39 to the upper end 37 of the barrier frame 35. It should be appreciated that each individual barrier element 40 may have a different curvature, shape, or angular orientation based upon the relative positioning of the window 24 within the door 12.

Figure 3:
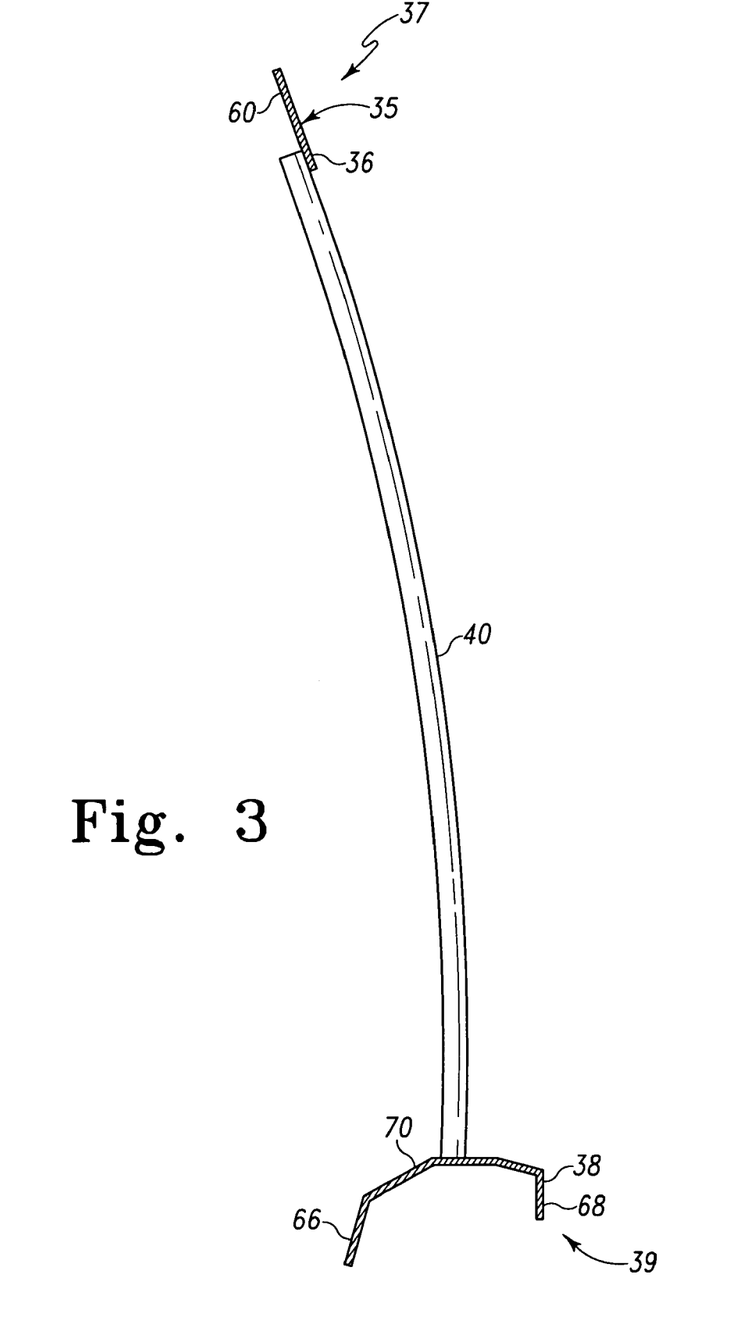
FIG. 3 is a cross-sectional view taken along line 3-3 of FIG. 2.
Figure 6:
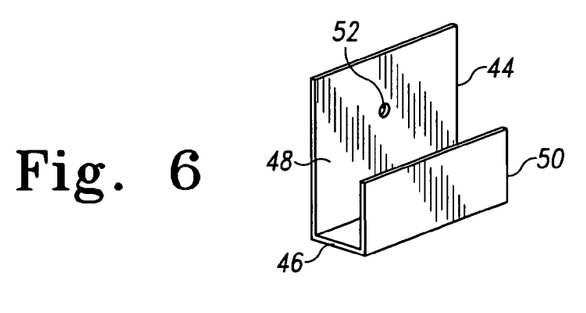
FIG. 6 is a perspective view illustrating the retaining clip for coupling the upper end of the window barrier to the vehicle door of FIG. 1A.

Referring further to FIGS. 3, 5, and 6, the upper frame member 36 is secured to upper portion 19a of the support frame 17 of the door 12 by first or upper securing members, illustratively a pair of clips 44. Each clip 44 includes a connector 46 and first and second arms 48 and 50 extending upwardly from the connector 46. The first arm 48 of the clip 44 includes an aperture 52. A fastener, such as a screw 54, is utilized to secure each clip 44 to the upper frame member 36 (FIG. 5). The second arm 50 of each clip 44 is received through a slot 56 formed or cut within inner door trim 23 secured to the support frame 17 of door 12. As such, the upper end 37 of the barrier frame 35 is secured to the door 12 by the clips 44 being positioned within the trim 23. As illustrated in FIG. 5, when the door 12 is closed, the window barrier 10 is further secured in place by a portion 60 of the upper frame member 36, along with a portion 61 of the first arm 48 of clip 44, being positioned intermediate the support frame 17 of door 12 and the rim 20 of the door frame 18 formed adjacent to the roof 22 of the vehicle 14. The portion 60 of upper frame member 36 and the portion 61 of clip 44 prevent movement of the barrier frame 35 inwardly, in the direction of arrow 62 in FIG. 5, by pushing against the rim 20 of door frame 18, and prevents movement of the barrier frame 35 outwardly, in the direction of arrow 64, by pushing against the clip 44 and, hence, the door 12. Upward movement of the barrier frame 35, in the direction of arrow 63 in FIG. 5, is restrained by upper ends of the barrier elements 40 engaging the rim 20 of door frame 18, while downward movement of the barrier frame 35, in the direction of arrow 65, is restrained by lower frame member 38 engaging the door panel 30.

Referring further to FIGS. 3 and 4, the lower frame member 38 includes a second or lower securing member, illustratively a longitudinally extending panel rest portion 66 and a retaining flange 68 connected to the panel rest portion 66 through a connecting portion 70. More particularly, the panel rest portion 66 and the retaining flange 68 extend downwardly from the connecting portion 70. The panel rest portion 66 is configured to rest against the interior surface 26 defined by the door panel 30, while the retaining flange 68 is configured to be received within a preformed, or existing, slot or channel 72 defined within the door 12 immediately adjacent to the inner portion 74a of the gaskets 74a, 74b defining the upper portion of window channel 25. A notch 76 is formed within the connecting portion 70 and the retaining flange 68 and is configured to receive the locking knob 34 of the door 12.

As may be readily appreciated from FIG. 4, the lower frame member 38 defines a substantially U-shaped channel 78 which captures the door panel 30, thereby preventing movement of the lower end 39 of the barrier frame 35 relative to the door 12. Likewise, the clips 44 of the upper frame member 36 define a pair of substantially U-shaped channels 80 configured to cooperate with the upper portion 42 of the door 12, thereby preventing movement of the upper end 37 of the barrier frame 35 relative to the door 12.

Installation of the window barrier 10 comprises the initial step of seating the barrier frame 35 against the door panel 30. More particularly, the panel rest portion 66 is placed against the interior surface 26 of the door panel 30 while the retaining flange 68 is received within the channel 72 adjacent the gasket portion 74a. The upper frame member 36 is likewise positioned against the upper portion 42 of the door 12. Next, the upper end 37 of the barrier frame 35 is used as a template to mark and slot the rubber door trim 58. The clips 44 are then slidably moved into the respective slots 56 in the trim 58. The screws 54 are each passed through the barrier frame 35 and fixed to the respective clips 44. Once installation is complete, the door 12 may be opened and closed as desired. The window barrier 10 protects the interior of the window pane 24 and increases the torsional rigidity of the vehicle door 12.

Referring now to FIGS. 7-13, a further illustrative embodiment window barrier 110 is shown. In the following detailed description, it should be noted that similar reference numerals refer to similar components as described above with respect to the embodiment of FIGS. 1A-6. The window barrier 110 is configured to removably couple to the interior side of a conventional door 112 supported by a vehicle 114. While the illustrated vehicle 114 used in combination with the window barrier 110 is a 2000-2002 Chevrolet Impala automobile, it should be appreciated that the window barrier 110 may find equal applicability with other vehicles.

Figure 11:
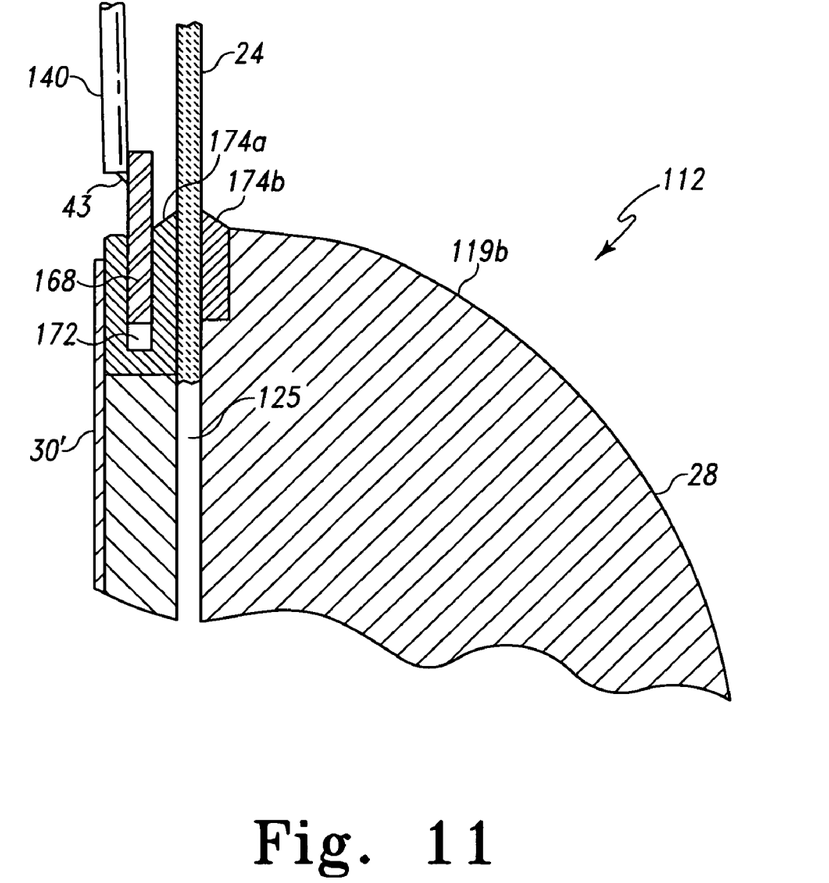
FIG. 11 is a cross-sectional view illustrating the coupling of the lower end of the window barrier of FIG. 7 to a door with a retrofit door panel.
Figure 12:
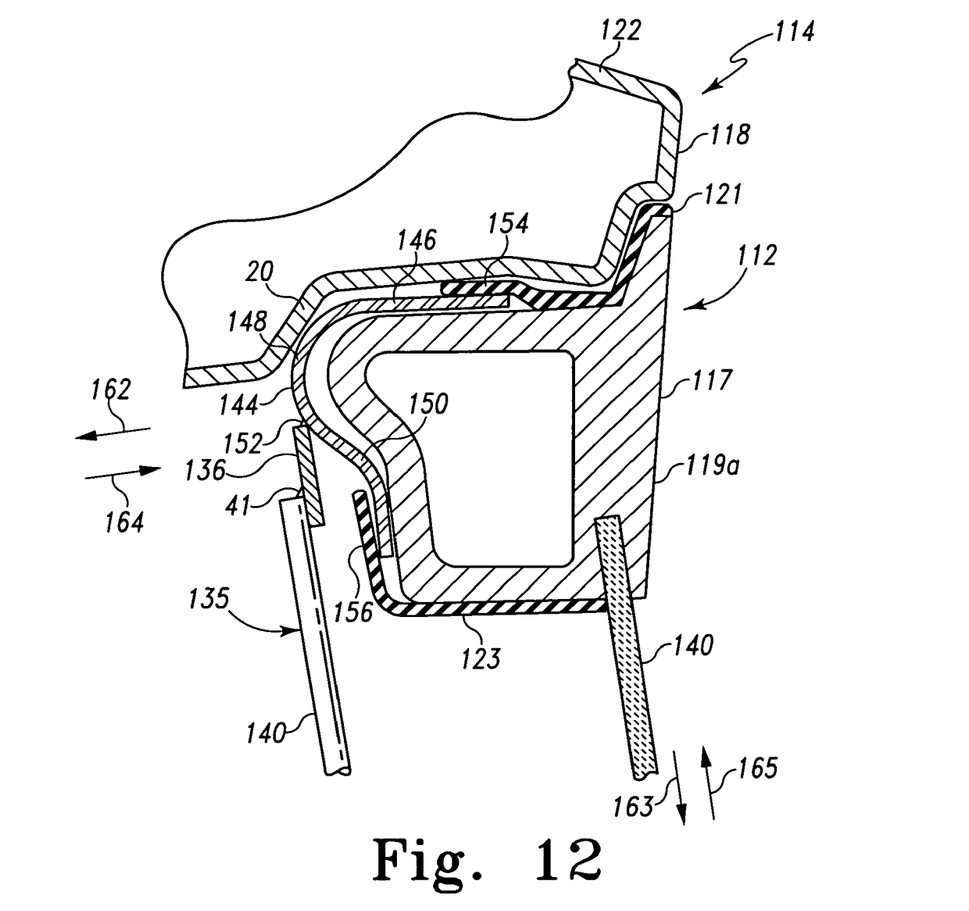
FIG. 12 is a cross-sectional view illustrating the coupling of the upper end of the window barrier of FIG. 7 to a door with a retrofit door panel.

With further reference to FIGS. 11 and 12, the door 112 is of conventional design and includes a support frame 117 which is hingedly supported within a door frame 118. The support frame 117 includes upper and lower portions 119a and 119b, while the door frame 118 includes a rim 120 positioned immediately below the roof 122 of the vehicle 114. The upper portion 119a of support frame 117 includes a cross-sectional shape complementary to an inner portion of the door rim 120. Outer and inner weather strips or door trims 121 and 123 are secured to the support frame 117 to provide a seal between the support frame 117 and the door frame 118 when the door 112 is in a closed position.

Figure 7:
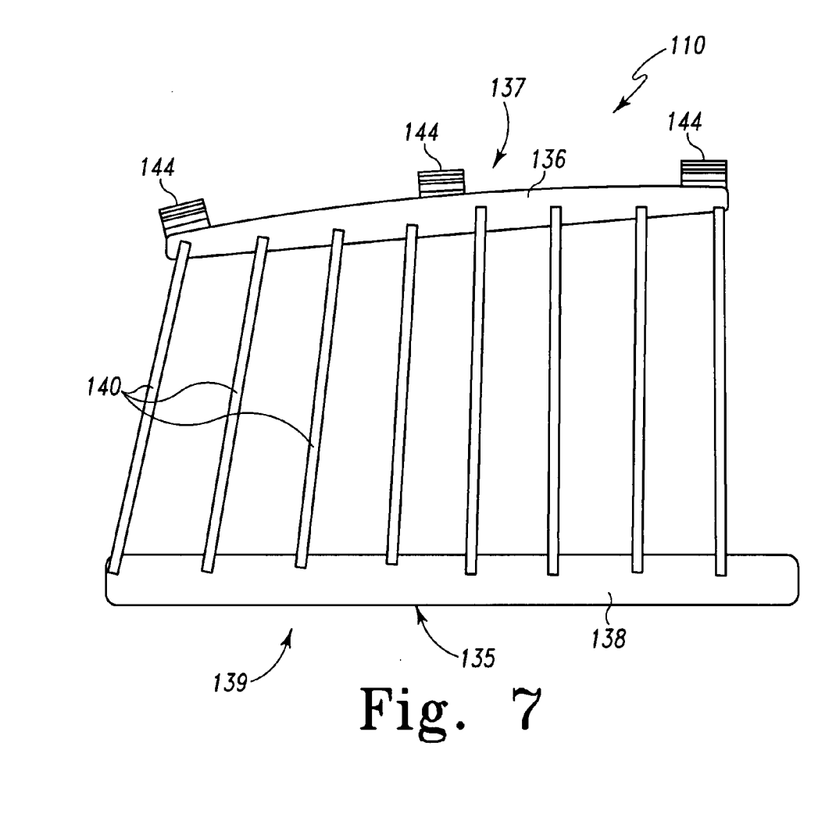
FIG. 7 is a front elevational view of a further illustrative embodiment window barrier of the present invention.
Figure 8:
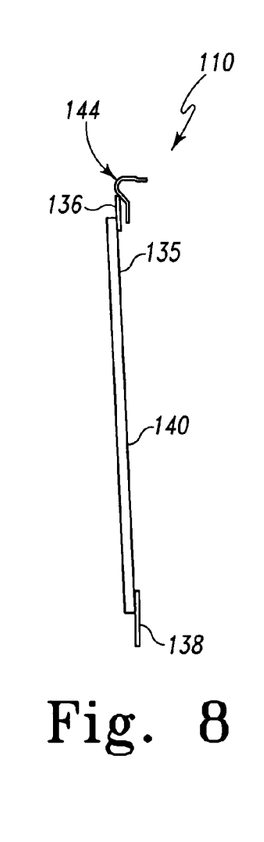
FIG. 8 is a side elevational view of the window barrier of FIG. 7.
Figure 9:
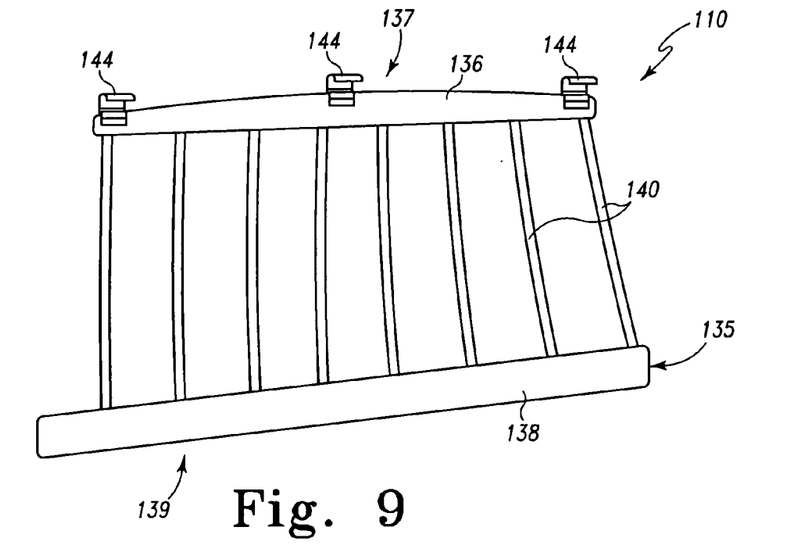
FIG. 9 is a rear perspective view of the window barrier of FIG. 7.
Figure 10:
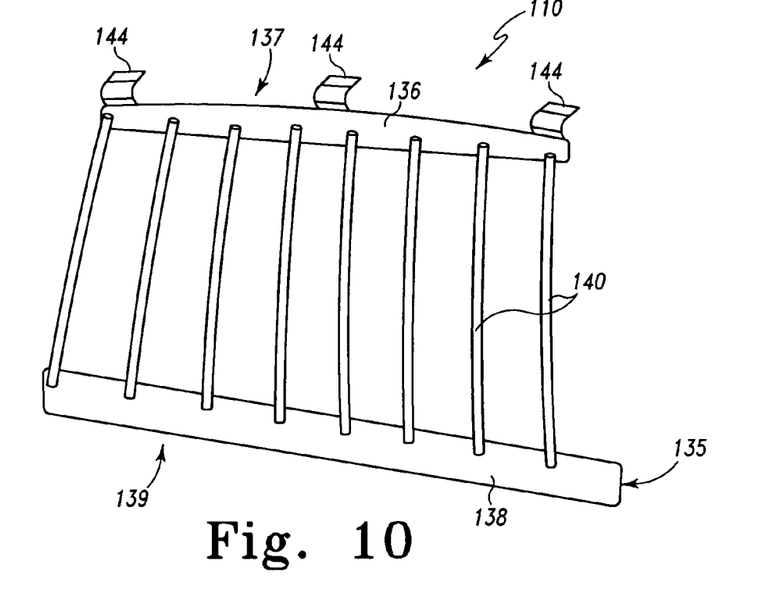
FIG. 10 is a front perspective view of the window barrier of FIG. 7.

As shown in FIGS. 7-9, the window barrier 110 includes a barrier frame 135 having an upper frame member 136 extending longitudinally and defining an upper end 137 of the barrier frame 135. A lower frame member 138 is supported in spaced relation below the upper frame member 136 and defines a lower end 139 of the barrier frame 135. A plurality of barrier elements or members 140 extend intermediate the upper end 137 and the lower end 139 of the barrier frame 135 and are attached to the upper frame member 136 and the lower frame member 138. The barrier elements 140 of window barrier 110 are substantially the same as the barrier elements 40 of window barrier 10 as detailed above in connection with FIGS. 1A-6.

Figure 13:
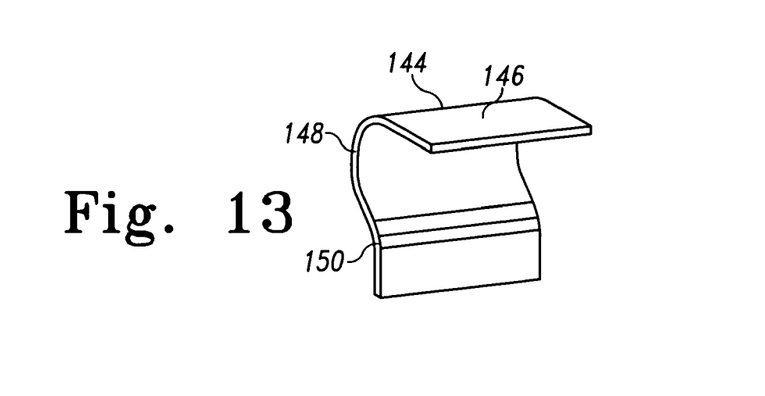
FIG. 13 is a detailed perspective view illustrating the retaining clip for coupling the upper end of the window barrier of FIG. 7 to the vehicle door.

Referring further to FIGS. 7, 8, and 12, the upper frame member 136 is secured to the upper portion 119a of the support frame 117 of door 112 by first or upper securing members, illustratively three spaced-apart clips 144. As shown in FIGS. 12 and 13, each clip 144 includes a outwardly extending first arm 146 connected by a connector 148 to a downwardly extending second arm 150. The first arm 146 extends outwardly from the passenger compartment 16 of the vehicle 114 in a substantially horizontal plane. The second arm 150 is disposed substantially perpendicular to the first arm 146 and extends in a substantially vertical plane. The connector 148 of each clip 144 is fixed, illustratively through a weld 152, to the upper frame member 136 of the barrier frame 135 (FIG. 12). The first arm 146 of each clip 144 is positioned intermediate the upper portion 119a of the support frame 117 and an inner portion 154 of the outer weather strip 121. As such, when the door 112 is closed, the first arm 146 is sandwiched intermediate the door rim 120 of the door frame 118 and the upper portion 119a of the support frame 117. The second arm 150 of each clip 144 is received intermediate the upper portion 119a of the support frame 117 and an inner portion 156 of the inner weather strip 123.

As such, the upper end 137 of the barrier frame 135 is secured to the door 112 by the first and second arms 146 and 150 of the clips 144 cooperating with the outer and inner weather strips 121 and 123, respectively. As illustrated in FIG. 12, when the door 112 is closed, the window barrier 110 is further secured in place by the connector 148 of each clip 144 being positioned intermediate the door 112 and the rim 120 of the door frame 118 formed adjacent to the roof 122 of the vehicle 114. The connector 148 prevents movement of the barrier frame 135 inwardly, in the direction of arrow 162 in FIG. 12, by pushing against the rim 120 of door frame 118, and prevents movement of the barrier frame 135 outwardly, in the direction of arrow 164, by pushing against support frame 117 of the door 12. Upward movement of the barrier frame 135, in the direction of arrow 163 in FIG. 12, is restrained by the first arm 146 of each clip 144 engaging the rim 20 of door frame 18, while downward movement of the barrier frame 135, in the direction of arrow 165, is restrained by the second arm 150 of each clip 144 engaging the support frame 117 of the door 112.

Referring further to FIGS. 7, 8 and 11, the lower frame member 38 defines a second or lower securing member, illustratively a longitudinally extending retaining flange 168. The retaining flange 168 is configured to be received within a preformed, or existing, slot or channel 172 defined within the door 112 immediately adjacent to the window channel 125. Illustratively, the upper portion of channel 172 is formed by the inner one of the gaskets 174a, 174b defining the window channel 125.

As may be readily appreciated from FIG. 11, receipt of the retaining flange 168 of the lower frame member 138 within the channel 172 of the door 112 helps prevent movement of the lower end 139 of the barrier frame 135 relative to the door 112. Likewise as shown in FIG. 12, the clips 144 of the upper frame member 136 define a plurality of substantially L-shaped channels 180 configured to cooperate with the upper portion 119a of the support frame 117 of door 112, thereby preventing movement of the upper end 137 of the barrier frame 135 relative to the door 112.

Installation of the window barrier 110 comprises the initial step of lowering the window panel 24 within the window channel 125. Next, the lower end 139 of the barrier frame 135 is coupled to the door 112 by inserting the retaining flange 168 of the lower frame member 138 into the channel 172. The upper end 137 of the barrier frame 135 is then pivoted up into position while the inner portion 154 of the outer weather strip 121 is manually lifted or pulled away from the upper portion 119a of the support frame 117 of door 112. The first arms 146 of the clips 144 are then simultaneously received intermediate the upper portion 119a of support frame 117 and the inner portion 154 of the outer weather strip 121. Next, the inner portion 156 of the inner weather strip 123 is manually pulled down and away from the upper portion 119a of the support frame 117. The barrier frame 135 is then pushed into place so that the second arms 150 of the clips 144 are received intermediate the inner portion 156 of the inner weather strip 123 and the upper portion 119a of the support frame 117. Once installation is complete, the door 112 may be opened and closed as desired.

While the invention has been described in detail with reference to certain illustrative embodiments, variations and modifications exist within the spirit and scope of the invention as defined in the following claims.

The invention claimed is:

1. A window barrier coupled to a vehicle door supported within a door frame, the vehicle door including a window panel supported within a window channel and door trim supported in spaced relation to the window channel, the window barrier comprising:
   an upper frame member;
   a lower frame member supported in spaced relation below the upper frame member;
   at least one barrier element extending between the upper frame member and the lower frame member;
   a first securing member releasably securing the upper frame member to the door, the first securing member including a retaining portion operably coupled with the door trim and positioned in spaced relation to the window channel, the first securing member including at least one clip coupled to the upper frame member, the clip including a connector and first and second arms extending from the connector, the second arm of the clip defining the retaining portion which is received within a slot formed within the door trim; and
   a second securing member releasably securing the lower frame member to the door, wherein a portion of at least one of the upper frame member and the first securing member is positioned intermediate the door frame and the door such that movement of the upper frame member in a first direction is prevented by the door frame and movement of the upper frame member in a second direction opposite the first direction is prevented by the door.

2. The window barrier of claim 1, wherein the first securing member is received within a slot formed within the door trim.

3. The window barrier of claim 1, wherein the door trim comprises weather strip supported by the door frame.

4. The window barrier of claim 1, wherein the first arm of the clip is received intermediate an outer weather strip and the door, and the second arm of the clip is received intermediate an inner weather strip and the door.

5. The window barrier of claim 1, wherein the clip includes a portion received intermediate the door frame and the door.

6. The window barrier of claim 1, wherein the second securing member includes a longitudinally extending retaining flange received within a slot formed within an interior surface of the door.

7. The window barrier of claim 1, wherein the at least one barrier element includes a plurality of substantially vertically extending barrier members.

8. The window barrier of claim 7, wherein each of the barrier members comprises a rod having a substantially circular cross-section.

9. The window barrier of claim 7, wherein the plurality of barrier members generally follow the angle of inclination of the window panel supported by the door.

10. A window barrier coupled to a vehicle door supported within a door frame, the vehicle door including a window panel supported within a window channel, the window barrier comprising:
   a barrier frame including upper and lower ends;
   an upper securing member including at least one clip, the clip having a connector and first and second arms extending from the connector, the upper securing member being coupled to the barrier frame proximate the upper end and including a portion received intermediate the door frame and the door, wherein movement of the upper end of the barrier frame in a first direction is prevented by the door frame and movement of the upper end of the barrier frame in a second direction opposite the first direction is prevented by the door;
   a lower securing member coupled to the barrier frame proximate the lower end; and
   at least one barrier element supported by the barrier frame.

11. The window barrier of claim 10, wherein the first arm of the clip is secured to the upper end of the barrier frame and the second arm of the clip is received within a slot formed within the door.

12. The window barrier of claim 10, wherein the first arm of the clip is received intermediate an outer weather strip and the door, and the second arm of the clip is received intermediate an inner weather strip and the door.

13. The window barrier of claim 10, wherein the lower securing member includes a retaining flange received within a channel formed within the door intermediate the interior surface and a window supported within the door.

14. The window barrier of claim 13, wherein the lower securing member further includes a panel rest portion connected to the retaining flange and resting against an interior surface of the vehicle door.

15. The window barrier of claim 10, wherein the at least one barrier element comprises a plurality of substantially vertically extending barrier members.

16. A window barrier configured to be coupled to a vehicle door supported within a door frame, the vehicle door including a window panel supported within a window channel and door trim supported in spaced relation to the window channel, the window barrier comprising:
   an upper frame member;
   a lower frame member supported in spaced relation below the upper frame member;
   at least one barrier element extending between the upper frame member and the lower frame member;
   a clip configured to releasably secure the upper frame member to the door, the clip having a horizontal connector and first and second vertical arms extending in substantially parallel relation upwardly from the connector, the first arm being coupled to the upper frame member and the second arm being positioned in spaced relation to the first arm and the window channel and configured to operably couple with the door trim; and
   a fastener coupling the first arm to the upper frame member.

17. The window barrier of claim 16, further comprising a longitudinally extending retaining flange coupled to the lower frame member and configured to be received within a slot formed within an interior surface of the door.

18. The window barrier of claim 17, further comprising a panel rest portion and a connecting portion connecting the panel rest portion to the retaining flange.

* * * * *